Figure 1:
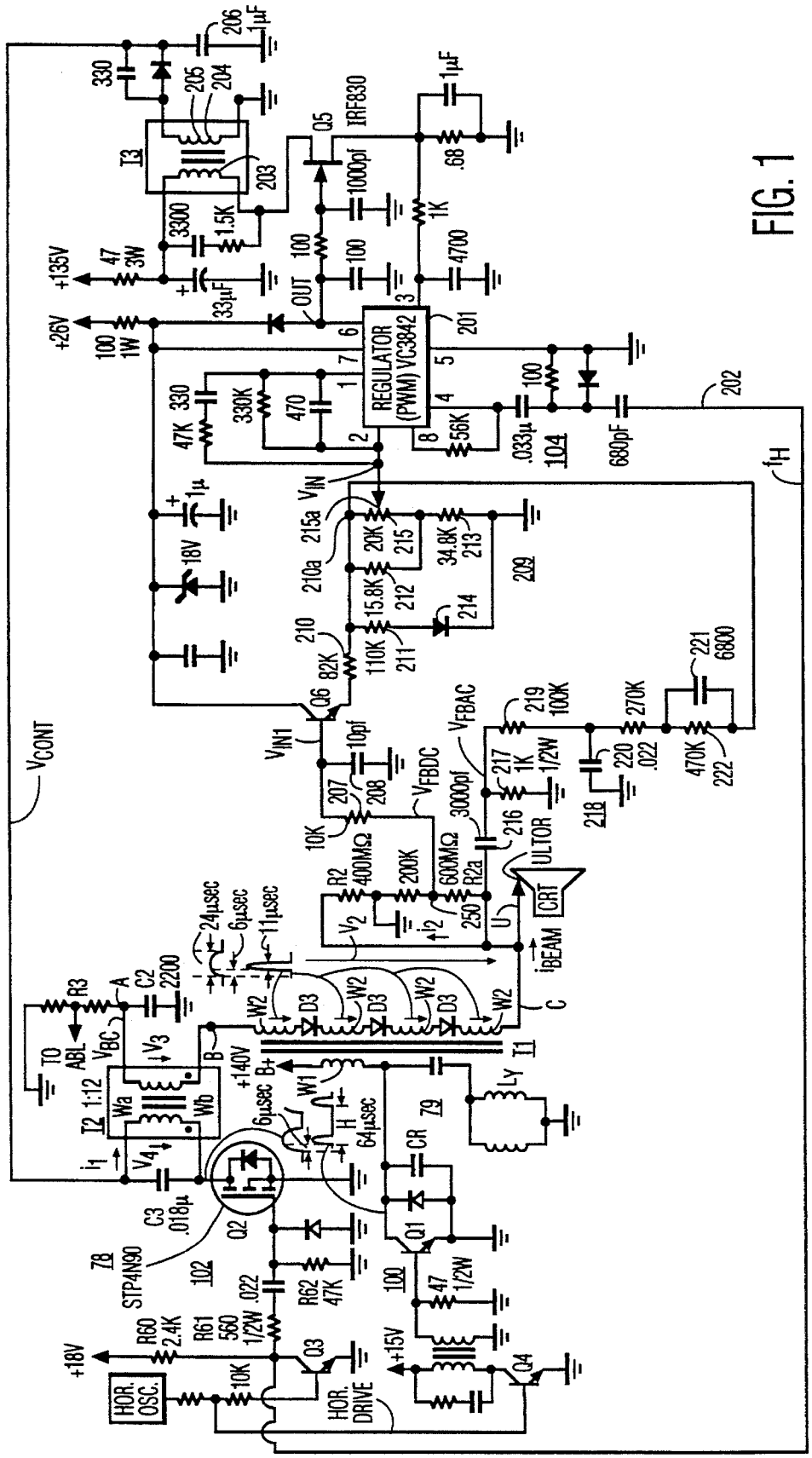

United States Patent [19]
Fitzgerald

[11] Patent Number: 5,463,290
[45] Date of Patent: Oct. 31, 1995

[54] POWER SUPPLY STABILIZATION CIRCUIT WITH SEPARATE AC/DC NEGATIVE FEEDBACK PATHS

[75] Inventor: William V. Fitzgerald, Zionsville, Ind.

[73] Assignee: Thomson Consumer Electronics, Inc., Indianapolis, Ind.

[21] Appl. No.: 236,065

[22] Filed: May 2, 1994

[51] Int. Cl.⁶ ............................. H01J 29/70; H04N 5/63
[52] U.S. Cl. ........................................ 315/411; 348/730
[58] Field of Search .................................. 315/411, 389; 348/730

[56] References Cited

U.S. PATENT DOCUMENTS

| | | | |
|---|---|---|---|
| 4,184,104 | 1/1980 | Shouse, Jr. | 315/371 |
| 4,298,829 | 11/1981 | Luz | 315/408 |
| 4,559,481 | 12/1985 | Dietz | 315/411 |
| 4,645,990 | 2/1987 | Willis | 315/411 |
| 4,658,342 | 4/1987 | Wharton | 315/411 |
| 4,774,584 | 9/1988 | Schmadel | 358/190 |
| 4,801,852 | 1/1989 | Kashiwagi | 315/400 |
| 5,010,281 | 4/1991 | Rodriguez-Cavazos | 315/411 |
| 5,059,874 | 10/1991 | Oliver | 315/411 |

*Primary Examiner*—Gregory C. Issing
*Attorney, Agent, or Firm*—Joseph S. Tripoli; Joseph J. Laks; Sammy S. Henig

[57] ABSTRACT

A charge storage capacitor is coupled to an ultor electrode of a cathode ray tube for supplying a beam current when video loading variations occur. A relatively small resistor coupled in series with the capacitor develops an AC feedback signal that is indicative of beam current variations. The AC feedback signal developed in the resistor is coupled to a control input of a high voltage regulator in a negative feedback manner to compensate for the beam current variations. An ultor voltage is developed across a voltage divider. A DC feedback signal is coupled from a terminal of the voltage divider to the control input of the regulator. The DC feedback signal is low-pass filtered via a first low-pass filter. The AC feedback signal is low-pass filtered via a separate low-pass filter that provides less extensive low pass filtering than the first low-pass filter.

9 Claims, 1 Drawing Sheet

POWER SUPPLY STABILIZATION CIRCUIT WITH SEPARATE AC/DC NEGATIVE FEEDBACK PATHS

This invention relates to a power supply for a video apparatus with stabilization of, for example, the high voltage.

In television receiver or monitor circuits, the ultor accelerating potential or high voltage for a picture tube is, typically, derived by rectifying a retrace pulse voltage (CRT) developed in a high voltage winding of a horizontal output flyback transformer. The retrace pulse voltage is developed by a horizontal deflection circuit output stage that is coupled to the high voltage winding via the primary winding of the flyback transformer. The horizontal deflection circuit output stage comprises a horizontal deflection winding, a retrace capacitor and a trace switch, comprising a damper diode and a horizontal output transistor.

Because the high voltage circuit exhibits a certain amount of source impedance, increasing the load current drawn from the ultor terminal will result in a decreased ultor accelerating potential. Ultor voltage variations resulting from variation of beam current occur mainly due to a leakage inductance between the high voltage and the primary winding of the flyback transformer. Ultor voltage variations lead to reduced performance. The reduced performance is manifested by undesirable raster size variations, reduced peak brightness and poor focus at high beam currents.

Typically the ultor voltage is developed across a voltage divider formed by resistors having large values that form a bleeder. An intermediate terminal of the voltage divider may develop a feedlack signal.

In U.S. Pat. No. 4,559,481, entitled RASTER WIDTH REGULATION CIRCUIT, in the name of Dietz, the feedback signal is coupled to a control terminal of a supply regulator that produces a regulated low voltage supply voltage. The output of the voltage supply is coupled to a primary winding of the flyback transformer. A transistor switch produces a flyback pulse voltage in the primary winding that is transformer coupled to a high voltage winding to develop the ultor voltage. DC voltage regulation of the ultor voltage is obtained by varying the low level supply voltage in accordance a DC component portion of the feedback signal.

In the Dietz patent, a capacitor couples the anode or ultor electrode of the CRT to the intermediate terminal of the voltage divider. Transient variations of the ultor voltage that occur as a result of beam loading variations are capacitively coupled to the intermediate terminal of the voltage divider via the capacitor to form an AC component portion of the feedback signal. The DC component portion of the feedback signal provides DC voltage regulation of the ultor voltage, as indicated before. The AC component portion of the feedback signal does not provide DC voltage regulation but speeds up the transient response time of the regulator.

Because the voltage divider is formed with large resistors, in the range of hundreds of mega- ohms, it may be susceptible for developing or picking up voltage spikes or a noise signal component in the feedback signal from the electric field in its vicinity. Such susceptibility is greater when the regulator is remote from the voltage divider. Typically, to prevent the high voltage regulator from responding to such noise signal component that may not be representative of anode current variations, the feedback signal is low-pass filtered. In the Dietz patent, the AC and DC component portions of the feedback signal are combined and both component portions of the feedback signal are filtered in the same filter.

In a high voltage regulator, embodying an inventive feature, a DC feedback signal is developed at an intermediate terminal of the voltage divider. A capacitor is coupled in series with a small resistor between the anode of the CRT and ground potential for developing in the resistor an AC feedback signal representative of beam current variations. The AC feedback signal, unlike in the Dietz patent, is coupled to the regulator via a separate feedback path from that of the DC feedback signal. The capacitor bypasses the voltage divider that produces the DC feedback signal. Therefore, advantageously, the AC feedback signal is not subject to the noise signal component that may develop in the voltage divider and that may affect the DC feedback signal. Consequently, the low-pas filtering of the AC feedback signal may be made less extensive than the low-pass filtering of the DC feedback signal. As a result, the response time of the regulator to beam current variations via the AC feedback signal is speeded up.

In contrast, in the Dietz patent, the capacitor is coupled to the intermediate terminal of the voltage divider. Therefore, the noise signal component is combined with both the AC and DC component portions of the feedback signal. In Dietz, both the DC and AC component portions are filtered by the same filter. As a result of the extensive low pass filtering of the AC component portion, the response time of the regulator to beam current variations is slowed down.

In accordance with another inventive feature, the resistor that is coupled in series with the capacitor is small in the order of, for example, 1 K. Therefore, additionally, the capacitor can provide energy storage for the ultor electrode. Because the resistor is small, it does not prevent the capacitor from supplying the beam current when a transient condition occurs in the beam current. In comparison, in the Dietz patent, the capacitor is coupled in series with a resistor of the voltage divider that is typically a substantially larger resistor. Therefore, the capacitor in Dietz may not be able to provide energy storage supplying beam current in a manner to reduce ultor voltage variations.

A high voltage power supply for a video apparatus, embodying an aspect of the invention, includes a switching arrangement coupled to a resonant circuit for generating a flyback pulse voltage at a terminal of a high voltage winding of a flyback transformer. A rectifier is coupled to the high voltage winding for rectifying the flyback pulse voltage to produce a rectified high voltage at a high voltage electrode of a cathode ray tube. A voltage regulator has a first control input responsive to an AC feedback signal that is indicative of beam loading variations and coupled to the high voltage winding for controlling an amplitude of the flyback pulse voltage in a negative feedback manner. A charge storage capacitance is coupled to the electrode for supplying a current that flows in the electrode to reduce a rate of change of the high voltage when a beam current variation occurs. The feedback signal is generated in accordance with the current in the capacitance.

FIG. 1 illustrates a horizontal deflection circuit with ultor voltage stabilization, embodying an aspect of the invention.

FIG. 1 illustrates a horizontal deflection circuit 100 and a high voltage stabilization circuit 102, embodying an aspect of the invention, that generates a stabilized ultor voltage U. For simplicity, east-west raster correction, horizontal linearity correction and component values, which are not relevant for explaining the invention, are omitted from the FIGURE.

High voltage stabilization circuit 102 of FIG. 1 includes a switching transistor Q2, responsive to a horizontal rate drive signal HORDRIVE, a retrace capacitor C3 and a primary winding Wa of a transformer T2. Transformer T2 has a secondary winding Wb for developing a flyback voltage V3 between terminals A and B. Winding Wb is coupled at terminal B in series with a tertiary, high voltage winding W2 of a flyback transformer T1. Winding W2 is formed by, for example, four winding segments that are coupled in series via diodes D3 that form a split diode arrangement, in a well known manner.

A switching transistor Q1 of deflection circuit 100, also responsive to horizontal rate drive signal HORDRIVE, generates a horizontal rate flyback or retrace voltage V1 in a deflection retrace of flyback resonant circuit 79 that is coupled via a primary winding W1 of transformer T1 to winding W2 to form a horizontal rate retrace or flyback high voltage V2 in winding W2.

High voltage V2 is equal to the sum of the retrace pulse voltages in each of the four winding segments of winding W2. The waveform of voltage V2 that is shown in the FIGURE would have been obtained across winding W2 had a diode split arrangement were not utilized but, instead, a rectifying diode had been coupled between an end terminal C of such winding W2 and an ultor electrode ULTOR of the picture tube. Such waveform of voltage V2 is equivalent to a sum of the voltage in the winding segments of winding W2. Ultor voltage U is generated in accordance with a sum of retrace voltage V2 and flyback voltage V3, as explained in U.S. Pat. No. 5,010,281 in the name of Rodriguez-Cavazos, entitled HIGH VOLTAGE STABILIZATION CIRCUIT FOR VIDEO DISPLAY APPARATUS.

A transformer current sampling resistor R3 and a capacitor C2 that are coupled in parallel are coupled between terminal A of winding Wb and ground. Consequently, a transformer current dependent negative voltage $V_{BC}$ is developed across resistor R3 at terminal A which serves to lower the settings of brightness or contrast or both at excessive average beam currents. Voltage $V_{BC}$ at terminal A has no appreciable influence on stabilization circuit 102 and, therefore, is not referred to in the description that follows.

Stabilization circuit 102 operates as an energy flywheel. When transistor Q2 is conductive, an increasing ramp current $i_1$ flows through winding Wa and stores energy in winding Wa. When transistor Q2 is switching off, the stored energy is transferred into retrace capacitor C3 and develops a retrace voltage V4 across capacitor C3 and across winding Wa that forms with capacitor C3 a flyback resonant circuit 78. Voltage V4 is transformer coupled to winding Wb and appears as flyback voltage V3 across winding Wb that is in series with retrace voltage V2.

A control circuit 104 of FIG. 1, embodying an inventive feature, that is included in circuit 102, provides an energizing voltage $V_{CONT}$ for controlling the amplitude of pulse voltage V4 and V3 of FIG. 1. The level of voltage $V_{CONT}$ varies in accordance with a DC feedback signal $V_{FBDC}$ that is developed at a terminal 250 of a voltage divider R2a coupled in parallel with bleeder resistor R2. Signal $V_{FBDC}$ is indicative of the level of ultor voltage U. Bleeder resistor R2 provides a focus voltage and a Grid 2 voltage, not shown, to the picture tube.

Signal $V_{FBDC}$ is coupled to a base of an emitter follower transistor Q6 via an R-C low pass filter, that is formed by a resistor 207 and a capacitor 208 to form an input signal $V_{IN1}$. Low pass filtering of signal $V_{FBDC}$ substantially reduces a noise signal component in signal $V_{IN1}$. The noise signal component is developed in large resistors R2 and R2a. The noise signal component may be produced by the large electric and magnetic fields in the vicinity of resistors R2 and R2a. Because of their large values, resistors R2 and R2a are prone to develop a large noise signal component. As a result of the low-pass filtering operation of resistor 207 and capacitor 208, changes in signal $V_{IN1}$ track relatively slowly changes in ultor voltage U that occur because of video loading variations.

Signal $V_{IN1}$ is coupled via transistor Q6 to a resistive summing or combining network 209 that is formed by a resistor 210 coupled to a resistor 211. Resistor 211 is coupled in series with a diode 214. Resistor 210 is coupled to a parallel arrangement of a resistor 212 and a potentiometer 215. A resistor 213 is coupled in series with the parallel arrangement of resistors 212 and 215. An adjustable terminal 215a of potentiometer 215 develops an input feedback signal $V_{IN}$. Signal $V_{IN}$ includes a DC signal component that is obtained from signal $V_{FBDC}$.

An anode or energy storage capacitor 216 is coupled to ultor electrode ULTOR for supplying a beam current $i_{BEAM}$, during transient variations of beam current $i_{BEAM}$ that occur as a result of video signal variations. Capacitor 216 reduces the rate by which ultor voltage U varies when a variation in beam loading occurs.

The portion of the negative feedback loop that includes resistor 207 and capacitor 208, operating as a low-pass filter, responds relatively slowly to beam current variation, as explained before because of extensive low pass filtering. Therefore, signal $V_{FBDC}$ may not provide adequate compensation to prevent a significant change in ultor voltage U during transient.

In accordance with an aspect of the invention, a small resistor 217 is coupled in series with anode capacitor 216 for producing an AC feedback signal $V_{FBAC}$. Signal $V_{FBAC}$ that is indicative of the current in capacitor 216 is indicative of the transient variations of beam current $i_{BEAM}$. The current in capacitor 216 changes at a relatively higher rate than ultor voltage U when beam current variation occurs because of energy storage in circuit elements that are coupled to ultor terminal ULTOR. Therefore, signal $V_{FBAC}$ provides an indication of an anticipatory change in ultor voltage U that can be more effective than signal $V_{FBDC}$. In this way signal $V_{FBAC}$ initiates correction of voltage U prior to signal $V_{FBDC}$. Advantageously, because signal $V_{FBAC}$ is coupled to ultor terminal ULTOR in a manner that bypasses large resistors R2 and R2a, it is substantially less susceptible to noise signal component than signal $V_{FBDC}$. Thus, capacitor 216 provides charge storage or operates as a low-pass filter with respect to ultor voltage variation. Capacitor 216 also operates as a DC blocking capacitor for generating signal $V_{FBAC}$ that is indicative of the current in capacitor 216. The two functions are obtained using only one high voltage capacitor.

Signal $V_{FBAC}$ is coupled via an R-C network 218 that includes a low-pass filter portion formed by a resistor 219 and a capacitor 220 and a high-pass filter portion that includes capacitor 221 coupled in parallel with a resistor 222. Resistor 222 and capacitor 221 are coupled to network 209 via a junction terminal 210a, between resistor 210 and resistor 215 or 212. Thus, signal $V_{IN}$ contains a second feedback signal component that is produced from signal $V_{FBAC}$.

A conventional pulse-width-modulator (PWM) 201 is responsive to input signal $V_{IN}$ for producing a pulse-width-modulated output signal OUT that is modulated in accordance with signal $V_{IN}$. PWM 201 operates at a horizontal frequency $f_H$ in accordance with a switching signal 202. Signal 202 is produced at the collector of transistor Q3 of FIG. 1. Signal OUT of FIG. 1 is coupled to a gate of a switching transistor Q5. A drain electrode of transistor Q5 is coupled to a primary winding 203 of a flyback transformer T3. A pulse-width modulated pulse voltage is produced in primary winding 203. Consequently, flyback pulse voltage 204 is developed in a secondary winding 205 of transformer T3. Pulse voltage 204 is rectified and filtered in a capacitor 206 to produce control voltage VCONT. Voltage VCONT is coupled to winding Wa of transformer T2 of FIG. 1. The amplitude of pulse voltage 204 and that of voltage VCONT varies in accordance with signal $V_{IN}$.

In accordance with an inventive feature, a change in beam loading causes a change in ultor voltage U to be corrected faster via the AC feedback path that includes capacitor 216 and resistor 217 than via the separate, DC feedback path that includes resistor R2a, resistor 207 and capacitor 208. This is so because the low-pass filtering via the DC feedback path is made more extensive than via the AC feedback path. The extensive low-pass filtering in the DC feedback path is required for eliminating a noise signal component that maybe developed in resistor R2a. In contrast, because capacitor 216 is not directly connected to terminal 250, it is not subject to the noise signal component developed in resistor R2a. Therefore, advantageously, signal $V_{FBAC}$ need not be so extensively low-pass filtered as signal $V_{FBDC}$.

DC voltage stability of ultor voltage U is controlled by signal $V_{FBDC}$; whereas, transient stability of ultor voltage U is significantly controlled signal $V_{FBAC}$. The combination of the two feedback paths provides both steady state and transient voltage stabilization of ultor voltage U.

What is claimed is:

1. A high voltage power supply for a video apparatus, comprising:

a flyback transformer;

a resonant circuit;

switching means coupled to said resonant circuit for generating a flyback pulse voltage at a terminal of a high voltage winding of said flyback transformer;

a rectifier coupled to said high voltage winding for rectifying said flyback pulse voltage to produce a rectified high voltage at a high voltage electrode of a cathode ray tube;

a voltage regulator having a first control input responsive to an AC feedback signal that is indicative of beam loading variations and coupled to said high voltage winding for controlling an amplitude of said flyback pulse voltage in a negative feedback manner;

a charge storage capacitance coupled to said electrode for supplying a current that flows in said electrode to reduce a rate of change of said high voltage when a beam current variation occurs; and means coupled to said capacitance and responsive to a current that flows in said capacitor for generating said AC feedback signal in accordance with said current in said capacitance.

2. A power supply according to claim 1 wherein said high voltage is developed at an ultor electrode of said cathode ray tube.

3. A power supply according to claim 1 further comprising, a resistive voltage divider that is coupled to said ultor electrode for generating a DC feedback signal that is coupled to a second control input of said regulator for controlling a DC level of said high voltage.

4. A high voltage power supply for a video apparatus, comprising:

an inductance;

switching means coupled to said inductance for generating a flyback pulse voltage in said inductance;

a rectifier coupled to said inductance for rectifying said flyback pulse voltage to produce a rectified high voltage at a high voltage electrode of a cathode ray tube;

a voltage regulator coupled to said inductance for controlling an amplitude of said flyback pulse voltage in a negative feedback manner;

means for generating a first feedback signal that is indicative of a magnitude of said high voltage;

a filter for filtering said first feedback signal to produce a first filtered feedback signal that is coupled to a control input of said voltage regulator; and means coupled to said electrode for generating a second feedback signal that is indicative of variations of said high voltage when beam current variations occur, said second feedback signal being coupled to a control input of said voltage regulator in a manner that bypasses said filter.

5. A power supply according to claim 4 wherein said first feedback signal is a DC signal and said second feedback signal is an AC signal.

6. A power supply according to claim 4 wherein said first feedback signal generating means comprises a voltage divider coupled to said electrode.

7. A power supply according to claim 4 wherein said second feedback signal generating means comprises, a resistor coupled in series with a capacitor for generating said second feedback signal in said resistor.

8. A power supply according to claim 4 wherein said capacitor operates as a charge storage capacitor with respect to said electrode.

9. A power supply according to claim 4 wherein said electrode provides an ultor voltage to said cathode ray tube.

* * * * *